(12) United States Patent
Liang et al.

(10) Patent No.: US 11,584,481 B2
(45) Date of Patent: Feb. 21, 2023

(54) FLOATING OBSERVATION SYSTEM

(71) Applicant: CETC Ocean Information Co., Ltd., Hainan (CN)

(72) Inventors: Xin Liang, Hainan (CN); Jipeng Wang, Hainan (CN); Xueqing Zhang, Hainan (CN); Donghai Wang, Hainan (CN); Liwei Zhang, Hainan (CN); Mingrui Guo, Hainan (CN); Haolun Chang, Hainan (CN); Yu Du, Hainan (CN); Dazheng Wang, Hainan (CN)

(73) Assignee: CETC Ocean Information Co., Ltd., Yingzhou Town (CN)

( * ) Notice: Subject to any disclaimer, the term of this patent is extended or adjusted under 35 U.S.C. 154(b) by 1189 days.

(21) Appl. No.: 16/087,204

(22) PCT Filed: Mar. 16, 2017

(86) PCT No.: PCT/CN2017/076878
§ 371 (c)(1),
(2) Date: Sep. 21, 2018

(87) PCT Pub. No.: WO2017/162087
PCT Pub. Date: Sep. 28, 2017

(65) Prior Publication Data
US 2019/0084653 A1    Mar. 21, 2019

(30) Foreign Application Priority Data

Mar. 22, 2016 (CN) .......................... 201610165184.6
Mar. 22, 2016 (CN) .......................... 201610165925.0
(Continued)

(51) Int. Cl.
*B63B 22/20* (2006.01)
*G01C 13/00* (2006.01)
(Continued)

(52) U.S. Cl.
CPC .............. *B63B 22/20* (2013.01); *B63B 35/44* (2013.01); *G01C 13/00* (2013.01); *H01Q 1/34* (2013.01);
(Continued)

(58) Field of Classification Search
CPC ......... B63B 22/16; B63B 22/20; B63B 22/24; B63B 2211/02; B63B 35/44; H01Q 1/34;
(Continued)

(56) References Cited

U.S. PATENT DOCUMENTS 4,471,708 A * 9/1984 Wilson .................... A62C 3/10
114/265
4,986,121 A * 1/1991 Luscombe ............. G01C 21/16
73/178 R
(Continued)

FOREIGN PATENT DOCUMENTS

CN         1516661 A      7/2004
CN       101364669 A      2/2009
(Continued)

OTHER PUBLICATIONS

Hongyuan Li, Structure Fatigue Analysis Semi-Submersible Communication Platform, The outstanding masterchars degree thesis full-text database of China, Engineering science and technology II collect, 2016 the 02nd phases, Feb. 15, 2016.

*Primary Examiner* — Daniel V Venne
(74) *Attorney, Agent, or Firm* — Bayramoglu Law Offices LLC

(57) ABSTRACT

A floating observation system includes a floating platform. The floating platform includes an upper deck, upright posts, a device compartment, a ballast compartment, a radome structure and a device installation base. Top ends of the upright posts are connected to the upper deck, and bottom ends of the upright posts are connected to the device
(Continued)

compartment. The ballast compartment is connected to the device compartment. The radome structure is borne on the upper deck. The device installation base is arranged on an outer surface of the floating platform. Various types of auxiliary devices are borne by the upper deck and the device compartment on the floating platform. Various observation devices borne by the device installation base are arranged on the outer surface of the floating platform to observe different kinds of information and to observe spaces above, on and under water, thus meeting a demand for comprehensive observation in all dimensions.

8 Claims, 6 Drawing Sheets

(30) Foreign Application Priority Data

Mar. 22, 2016 (CN) .......................... 201610166632.4
Mar. 22, 2016 (CN) .......................... 201610166641.3

(51) Int. Cl.
    *B63B 35/44*     (2006.01)
    *H01Q 21/28*     (2006.01)
    *H01Q 1/34*     (2006.01)
    *H01Q 1/42*     (2006.01)
    *H04N 7/18*     (2006.01)
    *B63B 22/24*     (2006.01)
    *B63B 22/16*     (2006.01)

(52) U.S. Cl.
    CPC ................ *H01Q 1/42* (2013.01); *H01Q 21/28* (2013.01); *H04N 7/183* (2013.01); *B63B 22/16* (2013.01); *B63B 22/24* (2013.01); *B63B 2211/02* (2013.01)

(58) Field of Classification Search
    CPC .......... H01Q 1/42; H01Q 21/28; H04N 7/183; G01C 13/00
    USPC ....... 114/121, 256, 258, 264, 265, 266, 267; 367/4
    See application file for complete search history.

(56) References Cited

U.S. PATENT DOCUMENTS

| | | | |
|---|---|---|---|
| 5,150,987 A | 9/1992 | White et al. | |
| 6,980,228 B1 | 12/2005 | Harper | |
| 9,702,966 B2 * | 7/2017 | Batcheller | G01S 7/003 |
| 2009/0279383 A1 | 11/2009 | Napolitano et al. | |
| 2011/0006965 A1 | 1/2011 | Kits Van Heyningen | |
| 2011/0252880 A1 | 10/2011 | Hama | |
| 2012/0119692 A1 | 5/2012 | Ryu | |
| 2015/0130671 A1 | 5/2015 | Cordone | |

FOREIGN PATENT DOCUMENTS

| | | |
|---|---|---|
| CN | 201202579 Y | 3/2009 |
| CN | 101873385 A | 10/2010 |
| CN | 102353995 A | 2/2012 |
| CN | 102358397 A | 2/2012 |
| CN | 102446394 A | 5/2012 |
| CN | 202663176 U | 1/2013 |
| CN | 202718815 U | 2/2013 |
| CN | 203119501 U | 8/2013 |
| CN | 103529446 A | 1/2014 |
| CN | 103600814 A | 2/2014 |
| CN | 103612723 A | 3/2014 |
| CN | 203798724 U | 8/2014 |
| CN | 204197233 U | 3/2015 |
| CN | 104499733 A | 4/2015 |
| CN | 104925233 A | 9/2015 |
| CN | 204669070 U | 9/2015 |
| CN | 105045166 A | 11/2015 |
| CN | 105151241 A | 12/2015 |
| CN | 105716587 A | 6/2016 |
| CN | 105730641 A | 7/2016 |
| CN | 205389007 U | 7/2016 |
| CN | 105914461 A | 8/2016 |
| CN | 106026335 A | 10/2016 |
| CN | 205707197 U | 11/2016 |
| CN | 205725116 U | 11/2016 |
| CN | 205825958 U | 12/2016 |
| EP | 2966725 A1 | 1/2016 |
| GB | 2507370 A | 4/2014 |
| JP | S61290194 A | 12/1986 |
| JP | S00632790 A | 1/1988 |
| JP | H0510942 A | 1/1993 |
| JP | H06283918 A | 10/1994 |
| JP | 2008013038 A | 1/2008 |
| JP | 2009173100 A | 8/2009 |
| JP | 2010028410 A | 2/2010 |
| JP | 2012045981 A | 3/2012 |
| JP | 2015009591 A | 1/2015 |
| RO | 129075 B1 | 5/2015 |

* cited by examiner

FLOATING OBSERVATION SYSTEM

CROSS-REFERENCE TO RELATED APPLICATIONS

This Application is the National Stage filing under 35 U.S.C. § 371 of PCT Application Ser. No. PCT/CN2017/076878 filed on Mar. 16, 2017, which claims the benefit of Chinese Patent Application Nos. 201610166641.3 filed on Mar. 22, 2016; 201610165925.0 filed on Mar. 22, 2016; 201610166632.4 filed on Mar. 22, 2016; and 201610165184.6 filed on Mar. 22, 2016. The disclosures of all applications are hereby incorporated herein by reference in their entireties.

TECHNICAL FIELD

The present application belongs to the water observation technical field. In particularly, it relates to a floating observation system.

BACKGROUND

During recent years, the development of Marine resources has become an important foundation to support the rapid development of human society, and yet Marine informatization is considered as the premise of Marine resources development. With the development of electronic and communication technologies, the process of Marine informatization is deepening constantly, and the demand for Marine information observation is also expanding. In general, the observation object of the traditional Marine observation device is relatively single, and the observation space is relatively planar. And it is difficult to meet the comprehensive observation demands for Marine meteorology, hydrology, geology, biology, resources and Marine moving target information through three-dimensional observation. Meanwhile, all the bearing capacity, endurance capacity and communication capacity of the traditional ocean observation device are still to be improved, which leads to a limited observation capacity, and cannot meet the requirements of long-term comprehensive observation and timely communication of observation information.

SUMMARY

In view of the above defects and shortcomings existed in the art, it is expected to provide a floating observation system which has a powerful bearing capacity and also can meet the requirements of comprehensive observation.

The invention provides a floating observation system which comprises a floating platform. The floating platform comprises an upper deck, several upright posts, a device compartment, a ballast compartment, a radome structure and a device installation base.

Top ends of the upright posts are connected with the upper deck, bottom ends are connected with the device compartment, the ballast compartment is connected with the device compartment, the radome structure is borne on the upper deck, and the device installation base is set on the external surface of the floating platform.

In many embodiments of the present invention, the floating observation system provides a floating platform with a reasonable structure and powerful bearing capacity. Various types of auxiliary devices can be borne by the upper deck and the device compartment on the floating platform. Meanwhile, various observation devices can be borne by the device installation base arranged on the outer surface of the floating platform so as to observe different kinds of information and to stereoscopically observe the spaces above, on and under the water, thus meeting the demand for comprehensive observation in all dimensions.

In accordance with the floating observation system provided by some embodiments of the invention, the ballast compartment is further set to a construction including a central solid ballast compartment and a surrounding adjustable partial ballast compartment, the ballast compartment improves the stability and adaptability of the floating platform in harsh environments, and thus provides a guarantee for bearing more observation devices.

In accordance with the floating observation system provided by some embodiments of the invention, the device compartment is further divided into a plurality of independent closed cabins, which can guarantee the safety of other auxiliary devices when part of the cabin body is damaged, and improves the safety and adaptability of the system.

In accordance with the floating observation system provided by some embodiments of the invention, a multi-layer device layer is further arranged in the radome, and the radome has a plurality of wave-transmitting areas which have independent wave transmission coefficients corresponding to the device layer, so as to meet different wave-transmitting requirements of various antennas. In accordance with the floating observation system provided by some embodiments of the invention, the cross section of at least one of the upper deck, the upright posts, the device compartment, ballast compartment is configured to be circular, which can effectively reduce the influence on the structure movement from the ocean current directivity, and thus reduces the sensitivity of the floating platform on the environment load direction and improves the seakeeping quality and bearing capacity of the system;

In accordance with the floating observation system provided by some embodiments of the invention, it also sets a mooring system, and additionally arranges a buoyancy device or gravity device according to the actual water area environment, and thus enhances the environmental adaptability of the system.

In some embodiments of the invention, the floating observation system further sets up a combined energy system composed of a clean energy source power supply, fossil energy power supply, energy storage unit power supply and emergency energy power supply, and thus offers a strong-force cruising ability for the floating platform, and a guarantee for bearing a plurality of observation devices for comprehensive observation.

In some embodiments of the invention, the floating observation system further sets up a communication system with a plurality of communication means so as to ensure that the communication requirements in different water area environment can be met.

BRIEF DESCRIPTION OF THE DRAWINGS

The detailed description of the non-limited embodiments is described with reference to the following drawings, and other features, objects and advantages of the invention will become more obvious.

DETAILED DESCRIPTION OF THE EMBODIMENTS

Figure 1:
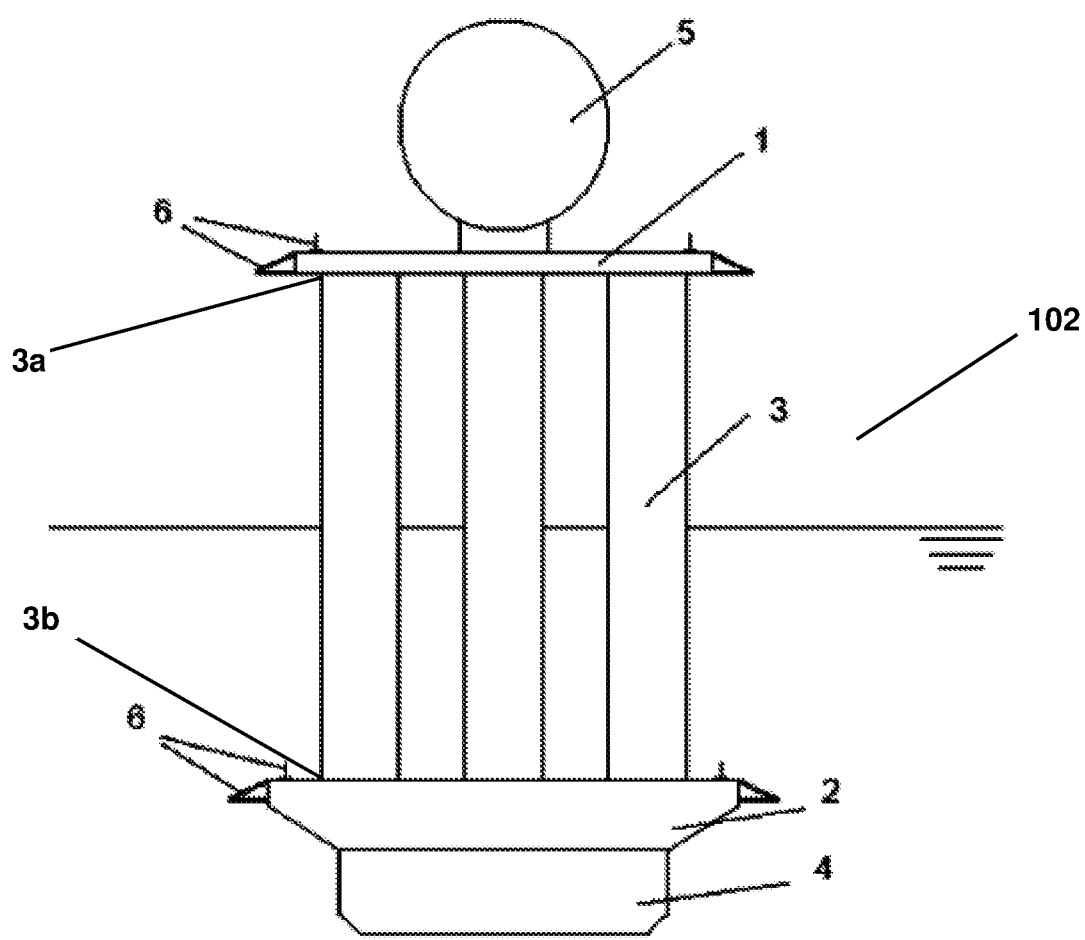
FIG. 1 is a schematic structural diagram of a floating platform in the floating observation system according to an embodiment of the present invention.

The present application is further described in detail with reference to the accompanying drawings and the embodiments. It is to be understood that the specific embodiments described herein are merely used for explaining the related inventions, and not the limitation of the invention. In addition, it should be noted that, for ease of description, only some parts related to the invention are shown in the drawings.

It should be noted that under the condition that no conflict exists, the embodiments in the present application and the features in the embodiments can be combined with each other. The present application will be described in detail below with reference to the accompanying drawings and in connection with the embodiments.

FIG. 1 is a schematic structural diagram of a floating platform in the floating observation system according to an embodiment of the present invention;

As shown in FIG. 1, in the embodiment, the floating observation system 100 provided by the invention comprises a floating platform 102, the floating platform comprises an upper deck 1, an device compartment 2 and a plurality of upright posts 3, a ballast compartment 4, a radome structure 5 and a device installation base 6.

Wherein, the top ends 3a of the upright posts 3 extend out of the water surface, and are connected with the lower surface of the upper deck 1, and the bottom ends 3b thereof are connected with the upper surface of the device compartment 2. Three upright posts 3 are arranged between the upper deck 1 and the device compartment 2 in the embodiment. In more embodiments, the number of the upright posts 3 can be set to be any number according to actual requirements, and can achieve the same technical effect.

In a preferred embodiment, the upright posts 3 have a hollow structure surrounded by the outer wall of upright posts, and the hollow structure is used as a channel to communicate with the upper deck 1 and the device compartment 2. In particular, on the one hand, the hollow structure can provide buoyancy for the system, and on the other hand, provides guarantee for connecting cables between the auxiliary devices arranged on the upper deck 1 and the auxiliary devices arranged in the device compartment 2.

In more embodiments, the upright posts 3 can also be arranged to be of a closed hollow structure or a solid structure or other different structures according to actual requirements. And an independent protective channel is additionally arranged for the connecting cables between the auxiliary devices on the upper deck 1 and the auxiliary devices arranged in the device compartment 2.

Figure 2:
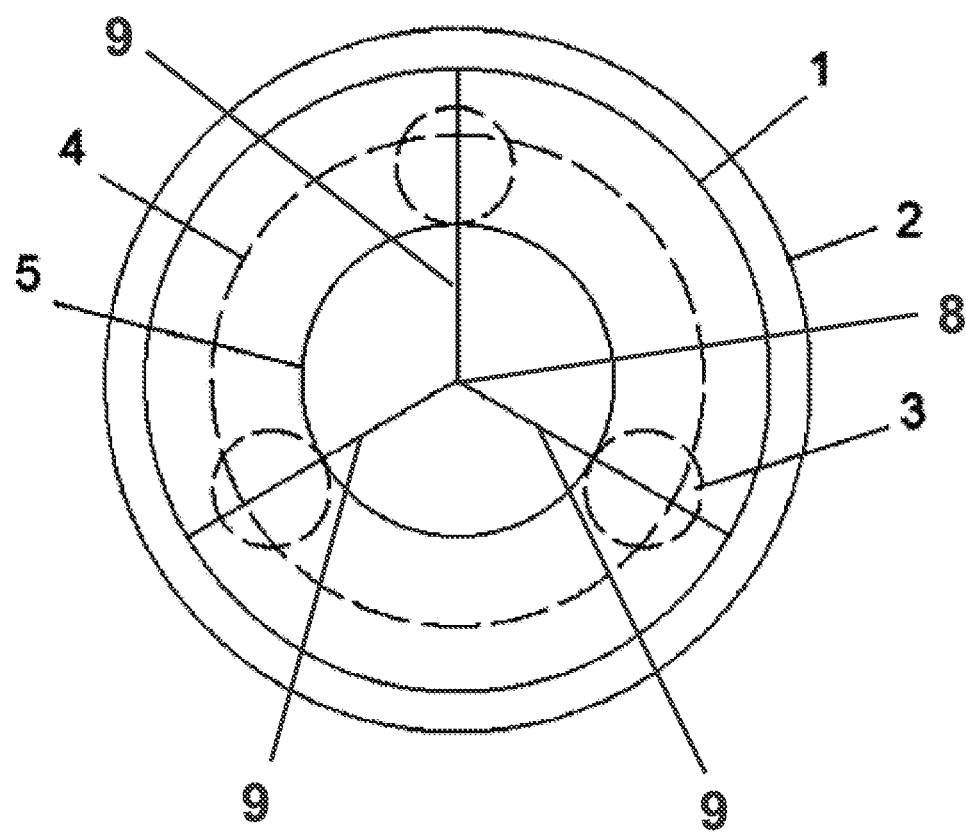
FIG. 2 is a top perspective view of the floating platform shown in FIG. 1.

FIG. 2 is a top perspective view of the floating platform shown in FIG. 1. As shown in FIG. 2, each of the upright post 3 is uniformly arranged around the central axis of the upper deck 1 in the embodiment. The included angle between every two adjacent upright posts 3 is 120 degrees. The above arrangement form of the upright posts is helpful for the floating platform to keep balance in water.

In more embodiments, each of the upright post can also adopt different setting modes such as central symmetry according to actual requirements, and may achieve the same or similar technical effects. As also shown in FIG. 2, in the embodiment, the upright posts 3 is cylindrical, and the cross section thereof is circular, in more embodiments, the upright posts 3 can be configured into different shapes according to actual requirements.

A radome structure 5 is borne on the upper deck 1, meanwhile, various observation devices, the communication device and/or the clean energy power generation device can be borne through the device installation base 6, for example, an antenna device independent of the radome structure is borne by the antenna support, a solar power generation device and a wind power generation device are borne, and various observation device and the like is also arranged on the upper deck 1 and an outrigger arranged on the side or the lower surface of the upper deck 1 through the device base. In the embodiment, the upper deck 1 is located above the water surface as shown in FIG. 1, and the cross section is circular as shown in FIG. 2; in more embodiments the upper deck 1 may floated on the water surface by adjusting the ballast compartment 4 and the like according to actual requirements, and the cross section can be set to be of different shapes.

In a preferred embodiment, the upper deck 1 further comprises a pontoon structure which is used for further providing the buoyancy force for the floating platform.

Various different device can be placed in the device compartment 2, and it is easy for those skilled in the art to understand that, the device compartment is preferentially used for various types of auxiliary devices which are required to be placed indoors, for example, various types of auxiliary devices are required to be placed indoors in an energy system, a communication system, and various observation devices and the like; and can be further used for containing various kinds of auxiliary devices which may be placed outdoors.

In the embodiment, the device compartment 2 is located below the water surface as shown in FIG. 1, which reduces the gravity center of the floating platform, and can improve the system stability and the hydrodynamic performance, and improve the effective load of the upper deck 1, and the cross section shown in FIG. 2 is circular; in more embodiments, the device cabin 2 can be floated on the water surface by adjusting the arrangement forms of the ballast compartment 4 and the like according to actual requirements. And the cross section can be set to be of different shapes.

In a preferred embodiment, a heat conducting device connected to the outer surface of the device compartment is arranged in the device compartment 2. Specifically, in the embodiment, the upper surface of the device compartment 2 is an underwater deck, the heat conduction pipe is configured to be connected with the underwater deck in the device compartment 2, and used for reducing the temperature in the device compartment 2. In more embodiments, different deployment modes (for example, communicated with the side surface or the lower surface) and different types of heat conducting devices can be set according to actual requirements and different types of heat conduction device so as to realize the same technical effects.

In a preferred embodiment, a ventilation system is further arranged in the device compartment 2 and is used for guaranteeing the safety of personnel operation.

Figure 3:
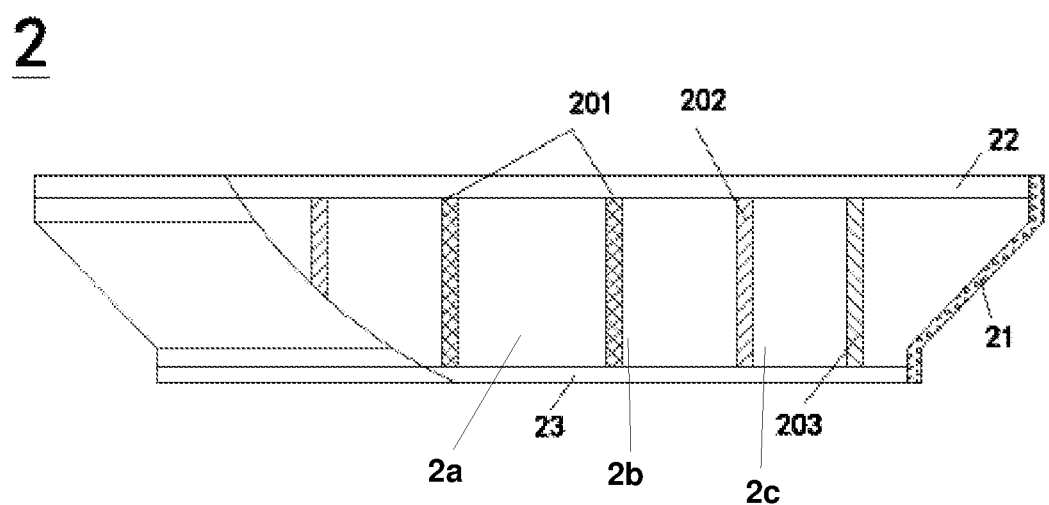
FIG. 3 is a cross-sectional view of a device compartment in a preferred embodiment of the floating platform shown in FIG. 1.

FIG. 3 is a cross-sectional view of a device compartment in a preferred embodiment of the floating platform shown in FIG. 1.

As shown in FIG. 3, in a preferred embodiment, the device compartment 2 is enclosed by an upper hatch cover 22, the lower hatch cover 23 and the outer wall 21, and the device compartment 2 are divided into a plurality of independent closed cabins. Namely, the device compartment 2 is composed of the above three parts from the structure of the outermost layer; while from the internal structure, a plurality of independent cabins are divided from the device compartment 2, and each cabin is closed, and thus the other cabins cannot be influenced even if some cabins leaks water, and also avoid water intake of the whole device compartment. The shape of the outer wall 21 can be in a variety of forms.

FIGS. 4-7 are schematic diagrams of a plurality of arrangement modes of each compartment in the device compartment. It should be noted that FIGS. 4-7 only shows the embodiments in which the outer wall 21 is circular. In more embodiments, the outer wall 21 can be set to be quadrilateral or other shape comprising an irregular shape and the like according to actual requirements.

In an alternative embodiment, the upper hatch 22 is removable from the outer wall 21, so as to place auxiliary devices in the device compartment 2 conveniently. Each independent cabin can take the upper hatch cover 22 as the top and also arrange independent top covers.

Meanwhile, several groups of enclosing walls are arranged in the device compartment 2, and independent cabins 2a, 2b, 2c are divided by the enclosing walls 201, 202, 203. Optionally, the enclosing wall and the outer wall 21 are integrally formed to an independent cabin. The arrangement modes of the enclosing walls are described below with reference to FIGS. 4-7.

Figure 4:
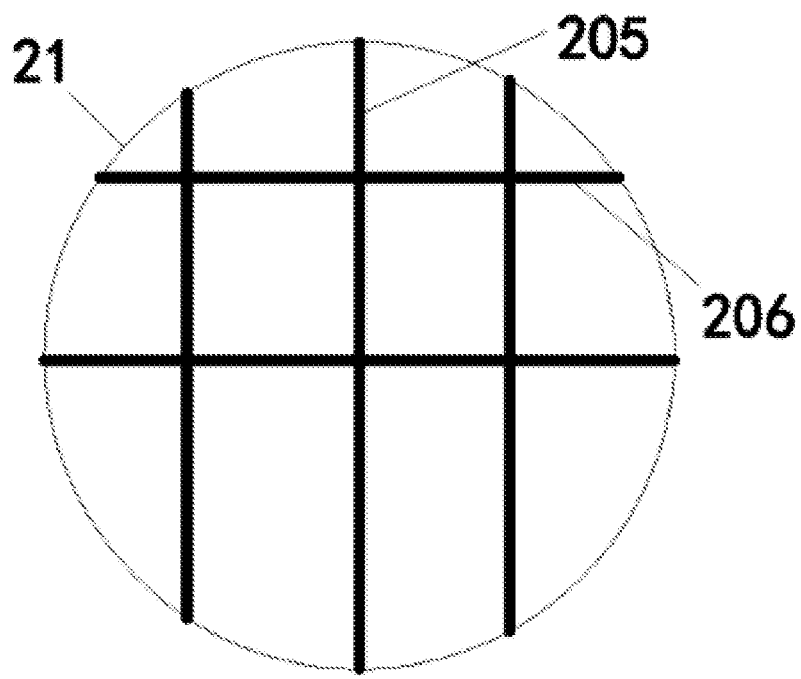
FIGS. 4-7 are schematic diagrams of a plurality of setting modes of each compartment in the device compartment.

In one embodiment, as shown in FIG. 4, the enclosing walls include transverse enclosing walls 206 and vertical enclosing walls 205, the transverse enclosing walls and the vertical enclosing walls form a quadrilateral cabin, and also surely form irregular cabins with the outer wall. The size of the cabin can be adjusted as required. In FIG. 4, since the outer wall is circular, the cabins in the outer ring are provided with an arc surface, the shape of the outer wall can be other shapes.

Figure 5:
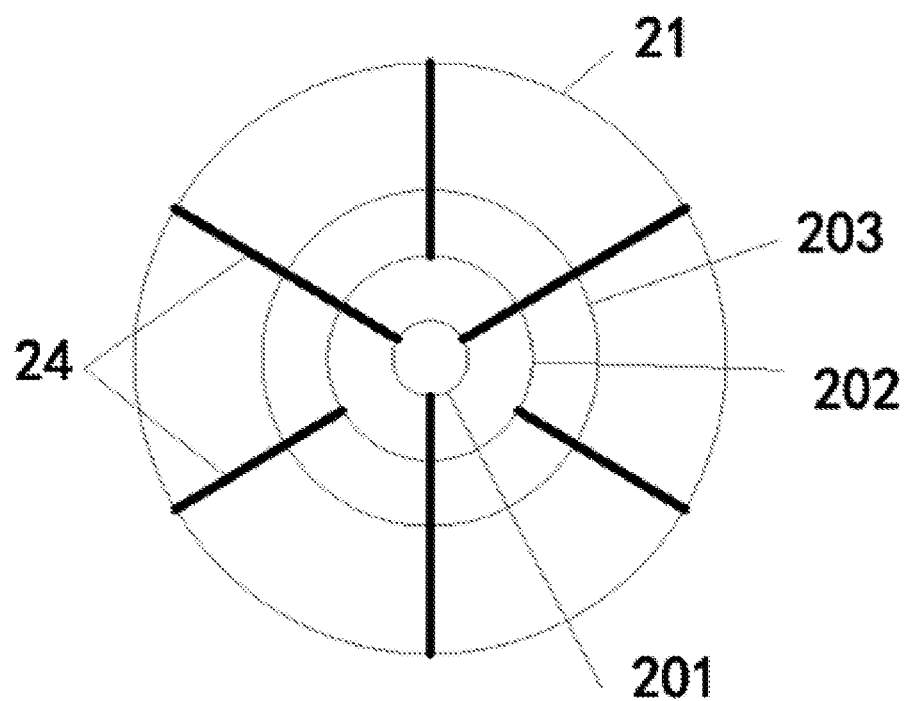
Figure 6:
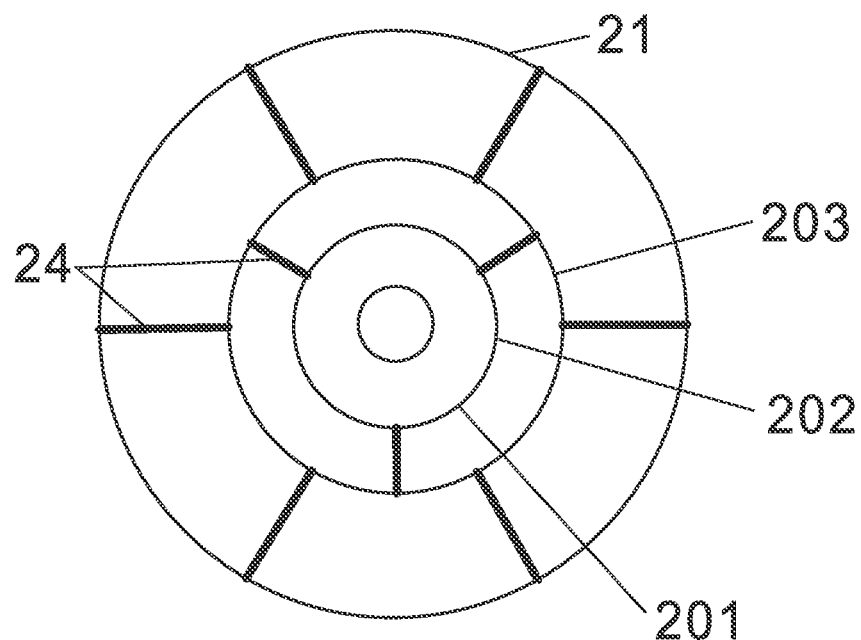
Figure 7:
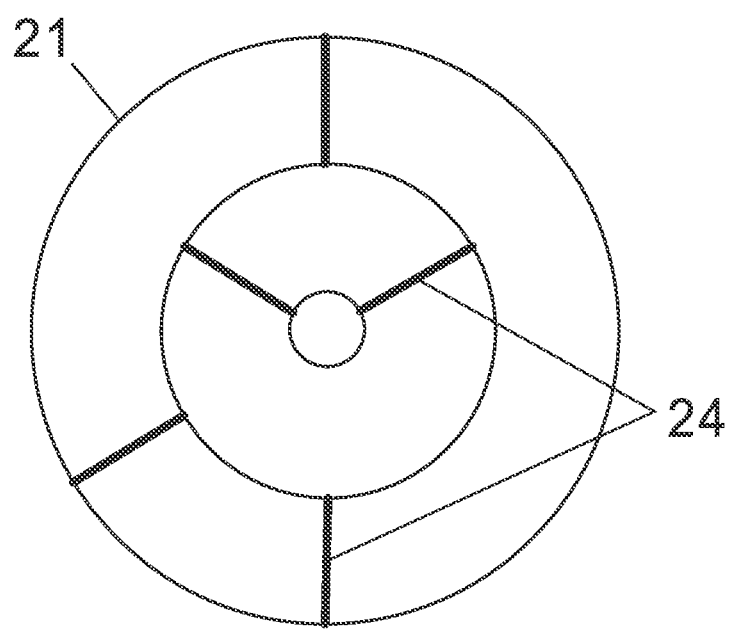

In another embodiment, as shown in FIGS. 5-7, and the enclosing walls comprise several groups of annular enclosing walls arranged in the device compartment (for example, three groups of annular enclosing walls in FIG. 6, and two groups of annular enclosing walls are arranged in FIG. 7), cabins are formed between each group of annular enclosing walls, and cabins is formed between the annular enclosing wall at the outermost layer and the outer wall, and a cabin is formed by the annular enclosing wall at the innermost layer.

In further, partition walls are hermetically arranged between the adjacent annular enclosing walls. Some inclosed partition walls can also be arranged between the annular enclosing wall at the outermost layer and the outer wall. Inclosed partition walls can also be arranged in the annular enclosing wall at the innermost layer. Certainly, the above three arrangement modes of partition walls can be implemented independently or jointly in the device compartment, and the function thereof lies in cabins that has been formed can be further divided into more independent cabins. A sealing door is arranged on the partition wall. When the sealing door is closed, the cabin can be further divided into more independent cabins, while the sealing door is open, the two adjacent cabins can be connected, and thus it is useful for conveniently dividiation and use of cabins. The arrangement direction of the partition walls can be set as needed, for example, in the annular enclosing walls of the embodiment, partition walls can be arranged in the vertical direction.

In one embodiment, there are three layers of annular enclosing wall (as shown in FIG. 5 and FIG. 6); the first layer is an inner ring enclosing wall; the second layer is a middle ring enclosing wall surrounding the inner ring enclosing wall, and the third layer is an outer ring enclosing wall surrounding the middle ring enclosing wall. a first cabin is formed by the inner ring enclosing wall, and a second cabin is formed by the middle ring enclosing wall and the inner ring enclosing wall; a third cabin is formed by the outer ring enclosing wall and the middle ring enclosing wall; and a fourth cabin is formed by the outer ring enclosing wall and the outer wall form.

Optionally, partition walls are arranged between the inner ring enclosing wall and the middle ring enclosing wall, partition walls is arranged between the middle ring enclosing wall and the outer ring enclosing wall, and partition walls are arranged between the outer ring enclosing wall and the outer wall.

The specific arrangement mode is that: three partition walls are uniformly arranged in the radial direction between the inner ring enclosing wall and the middle ring enclosing wall (for convenience of description, the three partition walls are referred to as inner partition walls below); six partition walls are uniformly arranged in the radial direction between the middle ring enclosing wall and the said outer ring enclosing wall in the radial direction (for convenience of description, the six partition walls are referred to as middle partition walls below); and six partition walls are uniformly arranged in the radical direction between the outer ring enclosing wall and the said outer wall (for convenience of description, the six partition walls are referred to as outer partition walls).

As shown in FIG. 5, the middle partition walls and the outer partition walls can be on a straight line; due to the fact that all the partition walls are evenly arranged, the three middle partition walls arranged at intervals in the six middle partition walls can also be on the same straight line with the inner partition wall. As shown in FIG. 6 and FIG. 7, the partition walls are not in the same straight line, which can also be used in the present invention. As shown in FIG. 7, the partition walls are not uniformly arranged.

It should be noted that the above description is only some optional implementation modes, and is not used for limiting the method and the device of the invention. it can be understood by those skilled in the art that the arrangement modes are not limited in the modes described above, and there are also many arrangement modes of those partition walls, the number of the annular enclosing walls can be freely set.

According to the above embodiments, the device compartment is divided into a plurality of independent closed cabins, which can guarantee the safety of other auxiliary devices when part of the cabin body is damaged, and improves the safety and adaptability of the system.

Figure 8:
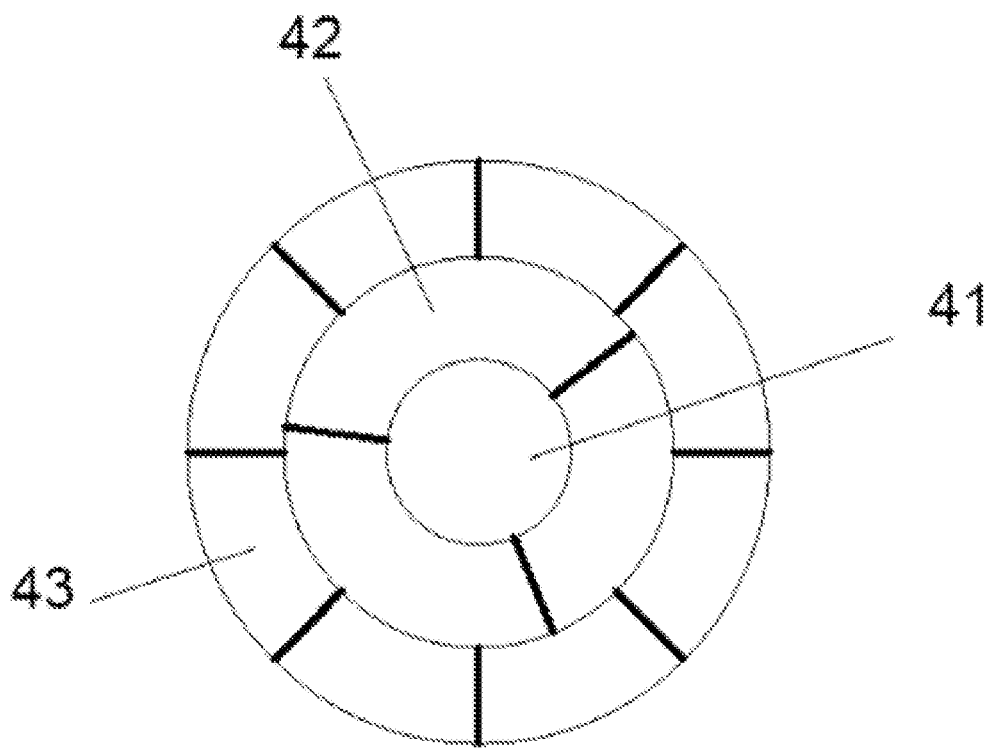
FIG. 8 is a schematic structural diagram of a ballast compartment in a preferred embodiment of the floating platform shown in FIG. 1.

FIG. 8 is a schematic structural diagram of a ballast compartment in a preferred embodiment of the floating platform shown in FIG. 1.

As shown in FIG. 8, in a preferred embodiment, the ballast compartment 4 includes a solid ballast compartment 41, and a plurality of adjustable partial ballast compartments arranged on the periphery of the solid ballast compartment.

Specifically, in the embodiment, the solid ballast compartment 41 is a disposable solid ballast compartment, and based on different of sea areas and tasks in use, the central ballast compartment may select different ballast weights, and the ballast can use, but not limited to, cement, gravel, metal and the like.

All of the adjustable partial ballast compartments are uniformly arranged in several ring shapes, as shown in FIG. 8, they include the inner ring adjustable partial ballast compartments 42 and outer ring adjustable partial ballast compartments 43 which are distributed in sequence around the solid ballast compartment 41 in the embodiment. In the embodiment, based on different of sea areas and tasks in use, the adjustable partial ballast compartments are water ballast compartments, and it can adjust ballasting water in the ballast compartments, and in more embodiments, it also adopt different ballast media and select different arrangement modes such as irregular arrangement, interval arrangement and the like for the adjustable partial ballast compartments.

In more embodiments, the central solid ballast compartments are arranged to be adjustable ballast compartments according to actual requirements, or different arrangement modes such as ballast compartments without the central positions.

As shown in FIG. 1 and FIG. 8, in the embodiment, the cross section of the ballast compartment 4 is circular. In more embodiments, the ballast compartments 4 can be set into different regular shapes and even irregular shapes according to actual requirements.

According to the above embodiments, the ballast compartment is configured as a structure comprising a central solid ballast compartment and a surrounding adjustable partial ballast compartment, and thus the ballast compartment improves the stability and adaptability of the floating platform in harsh environments, and thus provides a guarantee for bearing more observation devices.

Figure 9:
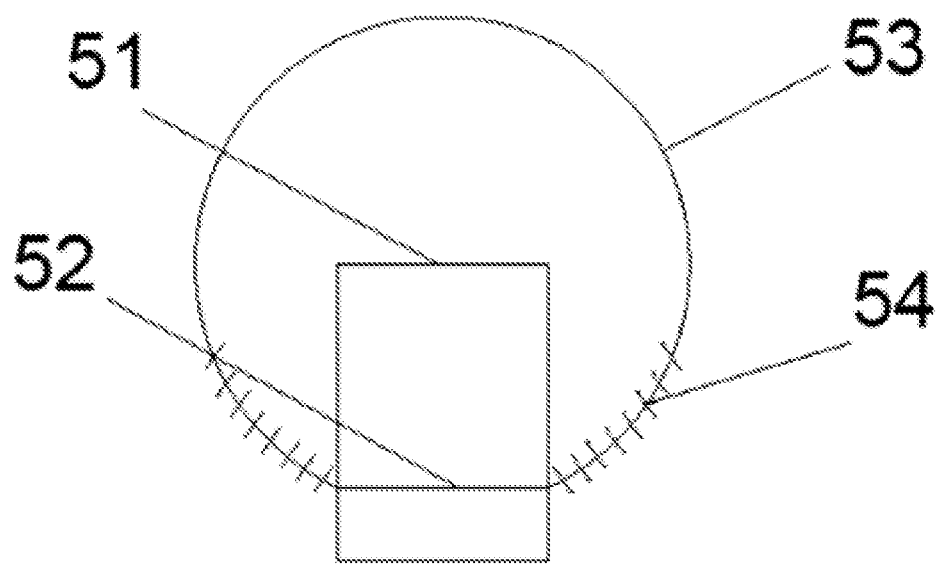
FIG. 9 is a schematic structural diagram of the radome structure in the preferred embodiment of the floating platform shown in FIG. 1.

FIG. 9 is a schematic structural diagram of the radome structure in the preferred embodiment of the floating platform shown in FIG. 1.

In a preferred embodiment, the radome structure 5 comprises an antenna seat and a radome. The antenna seat comprises at least two layers of device layers (e.g., first device layer and second device layer) used for containing antenna device, and filter separation is arranged between the device layers. The radome is arranged outside the antenna seat and comprises at least two wave-transmitting areas, the wave-transmitting areas have independent wave-transmitting coefficients and corresponds to at least one layer of device layer.

It should be noted that the above "antenna seat" is not limited to the mounting seat for the antenna device, it may be further used for placing various auxiliary devices except for placing the antenna device. Whether the auxiliary devices has the communication function or no, they can be arranged on the antenna seat as needed, whether the auxiliary devices have signal transmission or not, they can also be arranged on the antenna seat as needed.

The radome covers the outside of the antenna seat, and is not limited to completely wrap the antenna seat, and it at least covers all the auxiliary devices installed in all device layers.

The independent wave-transmitting coefficients refer to that the wave-transmitting coefficient of any wave-transmitting area cannot be influenced by the wave-transmitting coefficients of other wave-transmitting areas, it only needs to be set according to the requirements of the device corresponding to the device layer. For example, the corresponding device layer is provided with a L-waveband satellite communication antenna, and the wave-transmitting coefficient of the wave-transmitting area corresponding to the device layer at least meets the requirement that L-waveband frequency signals (waves) may entry and the L-waveband satellite communication antenna can obtain the signals;

Filter separation is performed by arranging filtering partition plates between each of the device layers. By combination with the corresponding wave-transmitting areas with an independent filtering coefficient, it guarantees that there is no signal interference between auxiliary devices in different device layers mounted on the antenna seat. In more embodiments, the filter separation can be set by persons skilled in other art.

Specifically, as shown in FIG. 9, in the embodiment, the antenna seat is provided with two layers, which comprises a first device layer 51 and a second device layer 52, filter separation is arranged between the first device layer 51 and the second device layer 52 to separate signals in different frequencies.

The radome comprises a first wave-transmitting area 53 at the top, and a second wave-transmitting area 54 in annular shape below the top, wherein the first wave-transmitting area 53 corresponds to the first device layer 51, and the second wave-transmitting area 54 corresponds to the second device layer 52.

In more embodiments, the annular wave-transmitting area can have a plurality of layers according to the number of the layer of the antenna seat, and each annular wave-transmitting area at least corresponds to one group of device layers.

In order to guarantee the wave-transmitting function of the most top, the above first wave-transmitting area 53 at the top is unsuitable in annular shape, and thus the spherical structure based on the radome is arranged in an arc-shaped curved surface shape. If the radome is arranged to be of a cubic structure, the first wave-transmitting area 53 can also be in a plane shape; if the radome is in an irregular shape, correspondingly the first wave-transmitting area 53 is also in an irregular shape. Those skilled in the art may understand that the first wave-transmitting area 53 at the top is used for ensuring the filtering effect, and the shape thereof is based on the shape of the radome.

The radome is composed of several groups of wave-absorbing material layers so that each wave-transmitting area has an independent wave-transmitting coefficient. The wave absorbing material layer can be an unsaturated polyester resin layer and/or a polyurethane foam layer. Of course, this is merely exemplary description, the material can be adjusted according to actual requirements so as to adjust the wave-transmitting coefficient, for example mixing the unsaturated polyester resin layer and the polyurethane foam layer, and the filtering coefficient is adjusted according to the mixing ratio by adding other materials used for using and adjusting the wave-transmitting coefficient and the like by those skilled in the art.

Figure 10:
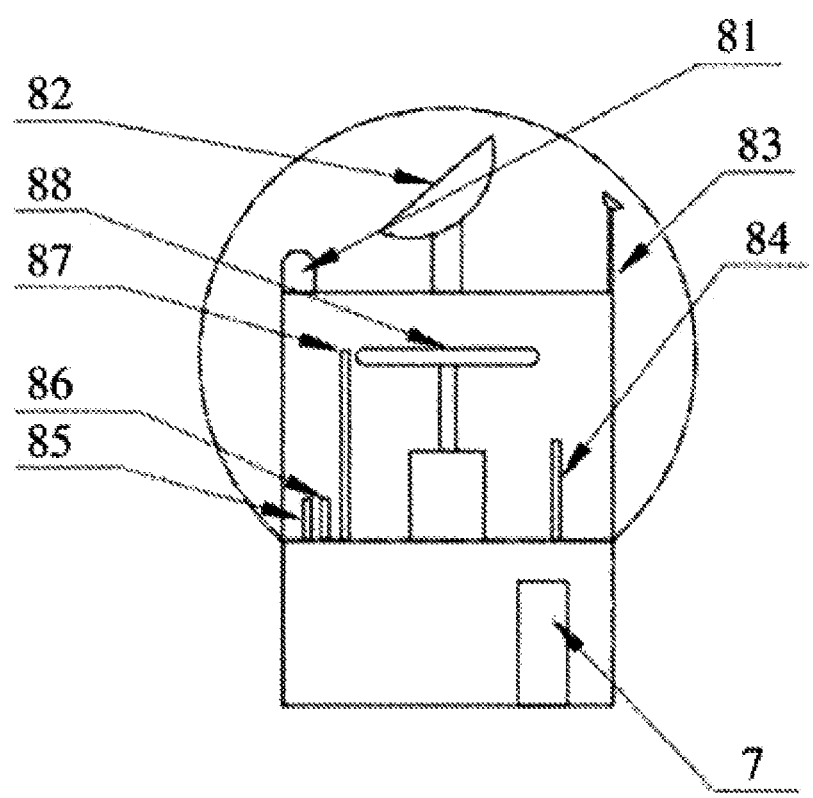
FIG. 10 is a perspective view of the radome structure shown in FIG. 9 after mounting devices.

It should be noted that, in FIG. 9, for clearly showing the top wave-transmitting area 921 and the bottom wave-transmitting area 922, and many line segments are added to the bottom wave-transmitting area 922, the line segments are only used for distinguishing, and are not used for limiting the shape of the radome. In FIG. 10, the distinguishing line segments are not shown.

In a preferred embodiment, the above antenna devices comprises at least one kind of antenna device as below: a monitoring radar antenna, an ultra-short wave communication antenna and automatic identification system (AIS for short) antenna, Automatic dependent surveillance-broadcast (ADS-b for short) antenna and a public mobile communication antenna, a radio station antenna, a Ku waveband satellite communication antenna, a L-waveband satellite communication antenna and an environment observation antenna.

FIG. 10 is a perspective view of the radome structure shown in FIG. 9 after mounting devices. Specifically, as shown in FIG. 10, in the embodiment, after mounting devices on the radome structure shown in FIG. 9, there are an environment monitoring antenna 81, a Ku waveband satellite communication antenna 82 and a L-waveband satellite communication antenna 83 arranged in the first device layer 51, and there are a radio station antenna 84, a public mobile communication antenna 85, an ADS-b antenna 86, an AIS antenna 87 and a monitoring radar antenna 88 arranged in the second device layer 52.

It is easy to understand that, the above antenna devices are optional, the auxiliary devices in the same device layer should have the same or similar frequency requirements so as to ensure normal work. As for the auxiliary devices having the requirements with large difference, it may correspondingly add the device layers, and adjust the position, the shape, the wave-transmitting coefficient and the like of the wave-transmitting area of the radome.

In a preferred embodiment, at the bottom of the antenna seat it is further provided with a cabinet 7 which can be used for placing auxiliary devices such as a power supply.

According to the above embodiments, a plurality of device layers are arranged in the radome, and the radome is arranged into the wave-transmitting areas having a plurality of independent wave-transmitting coefficients and corresponding to the device layers, so as to meet different wave-transmitting requirements of various antennas.

In a preferred embodiment, the device installation base 6 includes at least one of the following: the device seat arranged on the upper deck 1 and/or the device compartment 2; an antenna support arranged on the upper deck 1, and an outrigger arranged on the outer surface of the floating platform.

Specifically, the outrigger can be arranged the outer surface of any one of the upper deck 1, the device compartment 2 and the upright posts 3 and the ballast compartments 4 according to actual requirements, so as to observe the water, the water surface and the underwater space in all directions at different angles.

The various device installation bases can be provided with any one or more kinds of observation devices: an air measuring device, a wave measuring device, an ocean current measuring device, an air pressure measuring device and a rainfall measuring device, a water temperature measuring device, a salinity measuring device, a water depth measuring device and an image measuring device. Other kinds of observation devices and auxiliary devices suitable for water area observation can be further installed by persons skilled in the art.

Wherein, various device installation bases 6 installed under water comprises protective pipelines for cables, and the protective pipelines can be adopt, but not limited to, stainless steel pipes, a composite material pipe, a plastic pipeline and the like, and guarantee the safety of cable layout of the underwater devices through a sectional protection mode.

The above embodiment provides a floating platform with a reasonable structure and high bearing capacity. It is feasible to observe different kinds of information and to stereoscopically observe the spaces above, on and under the water through Various types of auxiliary devices which are borne by the upper deck and the device compartment on the floating platform, and various observation devices which can be borne by the device installation base arranged on the outer surface of the floating platform, and thus the demand for comprehensive observation in all dimensions can be met.

The above embodiment further comprises the cross sections of an upper deck 1 and a device chamber 2, the upright posts 3 and the ballast compartment 4 are circular. It effectively reduces the influence of the current directionality on the structural movement, so as to reduce the sensitivity of the floating platform to the environment load direction and improve the wave resistance and the bearing capacity of the system.

Preferably, the floating observation system provided by any one of the above embodiments can further comprise various types of observation device.

In a preferred embodiment, the floating observation system further comprises a mooring system, wherein the mooring system comprises a mooring device. The mooring device comprises a plurality of mooring chains 9 and an anchoring ends, one end of the mooring chain 9 is connected with the device compartment or the ballast compartment, and the other end is connected with the anchoring end.

Specifically, in the embodiment, the mooring device comprises three semi-tensioning mooring chains 9, and the mooring chain 9 is made of composite material cables, the anchoring end is a gravity anchor 8, and the mooring chain 9 is connected with the ballast compartment 4, the connecting points is one-point connection, and the connecting mode is a lifting lug hitching by welding.

In more embodiments, the mooring device may include only one mooring chain 9 and also has a plurality of mooring chains 9, and in further, it may adopt different number of mooring chains 9 in different water depths according to actual requirements. The mooring chains 9 can be selected one or more of the group including a tensioning type, a semi-tensioning type and a catenary type. The mooring chain 9 can be composed of only one component, and can also be composed of multiple components, wherein the component comprises, but is not limited to, a steel anchor chain, a nylon cable, a composite cable, a polyester cable, a steel cable, a steel tension leg and the like. According to the geological conditions and the requirements for use of the sea area, the anchoring end can be selected, but not limited to a large grabbing force anchor, a gravity anchor 8, a suction force anchor and the like. The mooring chain 9 can be connected with the ballast compartment 4, and also can be connected with the device compartment 3, The connection points can be set to be one-point connection or two-point connection, and the connecting mode can be a lifting lug hitching by welding or other different connecting modes which can be understood by those skilled in the art. In a preferred embodiment, the mooring system further comprises a buoyancy device or a gravity device connected to the mooring chain 9. For example, it may arrange a pontoon or a gravity block structure according to different water depths, or other buoyancy devices or gravity devices can be understood by those skilled in the art.

The above embodiment further arranges a mooring system, and additionally arranges a buoyancy device or a gravity device according to the actual water area environment, and thus improves the environment adaptability of the system.

In a preferred embodiment, the floating observation system provided by the invention further comprises an energy system. The energy system comprises a clean energy power generation unit, a fossil energy power generation unit, an energy storage unit and a control unit. Wherein, the clean energy power generation unit is arranged on the outer surface of the floating platform, the fossil energy power generation unit, the energy storage unit and the control unit are arranged in the device compartment 2.

Specifically, the clean energy power generation unit comprises devices capable of generating electricity by utilizing any one or more types of clean energy sources as below: solar energy, wind energy, wave energy, tidal energy, temperature difference energy and salt gradient energy. For example, a solar power generation device, a wind energy power generation device, a tidal energy power generation device and the like. Those skilled in the art can understand that the solar power generation device, the wind energy power generation device and other devices are arranged on the upper deck 1, the tidal energy power generation device and the like can be arranged at different positions on the water surface or underwater, but all of them are arranged on the outer surface of the floating platform so as to utilize clean energy in the environment.

The fossil energy power generation unit comprises devices capable of generating electricity by utilizing any one or more types of fossil energy resources as below: diesel, gasoline, natural gas and the like. For example, diesel power generation device, gasoline power generation device and the like. those skilled in the art can understand that various fossil energy power generation devices in the above can be used for the requirements of safety protection, and various devices in the energy storage unit and in the control unit should be arranged in the device compartment 2.

The energy storage unit can be configured as various electric storage devices which can be understood by those skilled in the art. The control unit can be configured as control software in intelligent devices such as a computer in the device compartment, or, and the hardware device is independently used for controlling the energy system according to the pre-configured strategy, and other configuration modes can be understood by those skilled in the art.

The control unit preferentially selects and controls various power generation devices in the clean energy power generation unit to generate electricity, and thus supplies power to the floating observation system and various types of device which are borne on the floating type observation system, and charge the energy storage unit at the same time, if a surplus exists in the power supply process;

When the clean energy power generation unit cannot meet the requirements of power supply, the control unit can control the fossil energy power generation unit and/or the energy storage unit to supply power;

When the energy storage capacity of the energy storage unit is lower than a preset proportion, the control unit can control the clean energy power generation unit and/or the fossil energy power generation unit to charge the energy storage unit.

In more embodiments, different control strategies may be configured for the control unit according to actual requirements.

In a preferred embodiment, the energy system further comprises an emergency energy unit independent of the energy storage unit, and the emergency unit is used for an emergency power supply under the control of the control unit.

Specifically, in the embodiment, the emergency energy unit is an electrical storage device. In more embodiments, the emergency energy unit may be configured to include at least one of the following types of devices according to actual requirements: electrical storage device, fossil energy power generation device and clean energy power generation device.

In the embodiment, the emergency energy unit is configured as devices which can provide a power supply when the control unit determines that the clean energy power generation unit, the fossil energy power generation unit and the energy storage unit cannot jointly maintain the endurance of the system.

In another preferred embodiment, the emergency energy unit may also be configured as a second set of energy systems which are alternatively used for power supply and energy storage with the energy system.

According to the above embodiment, a combined the clean energy power supply, the fossil energy power supply, the energy storage unit the emergency energy power supply, and thus offers a strong-force cruising ability for the floating platform, and a guarantee for bearing a plurality of observation devices for comprehensive observation.

In a preferred embodiment, the floating observation system provided by the invention further comprises a communication system.

The communication system comprises at least one of a Ku waveband satellite communication unit, a L-waveband satellite communication unit, a Beidou satellite communication unit, a short wave communication unit and a scattering communication unit.

Specifically, the signal coverage in a large range can be realized by configuring a L-waveband satellite communication unit and/or a Ku-waveband satellite communication unit, meanwhile, a corresponding communication terminal can be arranged on the shore base, and long-distance high-speed communication capability is provided for the floating observation system;

By configuring the Beidou satellite communication unit, positioning and short message services can be provided for the floating observation system;

By configuring the short wave communication system, The near-distance communication capability can be provided for the floating type observation system without restrictions by the hubs of a network and an active interrupt system;

Through configuring the scattering communication unit, the high-speed communication capability can be provided for the floating observation system in the middle and far sea area when the satellite is blocked.

Thus, for different application areas and communication requirements, the floating observation system may configure as the communication system including corresponding communication units, and further configure other communication units which can be understood by those skilled in the art.

It is easy to understand that, in the embodiment, the configuration of the communication unit in the above communication system are corresponding to the configuration of parts of the antenna devices in the radome structure; in more embodiments, it may also be configured to be not corresponding to each other according to a special requirement.

According to the above embodiment, the communication system are further provided with various communication means, and thus it guarantees to meet the communication requirements in different water area environments.

The units or modules described in the embodiments of the present application can be implemented in a software manner, and also be realized in a hardware manner. The described units or modules may also be arranged in a processor, for example, the control unit can be a software program arranged in a computer or a mobile intelligent device; and can also be a hardware device for independently carrying out the controlling of power supply and energy storage. wherein, the names of the units or modules do not constitute the limitation of the unit or the module under some circumstances, for example, the control unit can also be described as a power supply energy storage unit for controlling power supply and energy storage".

The above description is only the preferred embodiments of the present application and the specification of the applied technical principle. It should be understood by those skilled in the art that the scope of the invention related to the invention is not limited to the technical solutions in combination of the technical features, and also should be cover other technical solutions formed by combining optionally the above technical features or the equivalent features thereof without digressing from the conception of the invention. For example, the technical solutions are formed by alternative replacements of the features described in the above and the features having similar functions disclosed in the present application,

What is claimed is:

1. A floating observation system, comprising a floating platform;
   wherein the floating platform comprises an upper deck, upright posts, a device compartment, a ballast compartment, a radome structure, and a device installation base;
   top ends of the upright posts are connected with the upper deck, and bottom ends of the upright posts are connected with the device compartment; and
   the ballast compartment is connected with the device compartment, the radome structure is borne on the upper deck, wherein the ballast compartment comprising a plurality of adjustable partial ballast compartments arranged in a bottom of the device compartment and each of the plurality of adjustable partial ballast compartments are uniformly arranged in a ring shape.

2. The floating observation system according to claim 1, wherein the device installation base comprises:
   an antenna support arranged on the upper deck.

3. The floating observation system according to claim 1, wherein the upright posts have a hollow structure surrounded by an outer wall of the upright posts, and the hollow structure is used as a channel to communicate with the upper deck and the device compartment.

4. The floating observation system according to claim 3, wherein the upright posts are uniformly arranged around a central axis of the upper deck.

5. The floating observation system according to claim 1, wherein the radome structure comprises an antenna seat and a radome;
   the radome is arranged outside the antenna seat and comprises at least two wave-transmitting areas.

6. The floating observation system according to claim 5, wherein the antenna device comprises at least one kind of the antenna device as below:
   a monitoring radar antenna, an ultra-short wave communication antenna and automatic identification system (AIS) antenna, an automatic dependent surveillance-broadcast (ADS-b) antenna and a public mobile communication antenna, a radio station antenna, a Ku waveband satellite communication antenna, a L-waveband satellite communication antenna and an environment observation antenna.

7. A floating observation system, comprising a floating platform;
   wherein the floating platform comprises an upper deck, upright posts, a device compartment, a ballast compartment, a radome structure, and a device installation base;
   top ends of the upright posts are connected with the upper deck, and bottom ends of the upright posts are connected with the device compartment; and
   the ballast compartment is connected with the device compartment, the radome structure is borne on the upper deck, wherein the device compartment is enclosed by an upper hatch cover, a lower hatch cover and an outer wall, and the device compartment is divided into a plurality of independent closed cabins.

8. A floating observation system, comprising a floating platform;
   wherein the floating platform comprises an upper deck, upright posts, a device compartment, a ballast compartment, a radome structure, and a device installation base;
   top ends of the upright posts are connected with the upper deck, and bottom ends of the upright posts are connected with the device compartment and the ballast compartment is connected with the device compartment, the radome structure is borne on the upper deck, wherein a cross-section of at least one of the upper deck, the upright posts, the device compartment, and the ballast compartment is configured to be circular.

* * * * *